(12) United States Patent
Strandberg et al.

(10) Patent No.: US 12,494,314 B2
(45) Date of Patent: Dec. 9, 2025

(54) COMMON MODE CHOKE FOR CONNECTING TO DC SIDE OF POWER CONVERTER, FILTER ARRANGEMENT, AND POWER CONVERTER

(71) Applicant: Vacon Oy, Vaasa (FI)

(72) Inventors: Stefan Strandberg, Vörå (FI); Nicklas Södö, Vaasa (FI)

(73) Assignee: VACON OY, Vaasa (FI)

( * ) Notice: Subject to any disclaimer, the term of this patent is extended or adjusted under 35 U.S.C. 154(b) by 286 days.

(21) Appl. No.: 18/192,732

(22) Filed: Mar. 30, 2023

(65) Prior Publication Data
US 2023/0326646 A1    Oct. 12, 2023

(30) Foreign Application Priority Data

Apr. 6, 2022  (DE) .......................... 102022108345.4

(51) Int. Cl.
| | |
|---|---|
| *H01F 17/06* | (2006.01) |
| *H01F 27/28* | (2006.01) |
| *H01F 27/32* | (2006.01) |
| *H01F 37/00* | (2006.01) |
| *H02M 1/12* | (2006.01) |
| *H01F 17/00* | (2006.01) |

(52) U.S. Cl.
CPC ....... *H01F 17/062* (2013.01); *H01F 27/2876* (2013.01); *H01F 27/325* (2013.01); *H01F 37/00* (2013.01); *H02M 1/126* (2013.01); *H01F 2017/0093* (2013.01)

(58) Field of Classification Search
CPC .. H01F 17/062; H01F 27/2876; H01F 27/325; H01F 37/00; H01F 2017/0093; H02M 1/126
See application file for complete search history.

(56) References Cited

U.S. PATENT DOCUMENTS 6,917,273 B2    7/2005  Okamoto
9,825,714 B1 *  11/2017  Braylovskiy ........... H01F 27/38
(Continued)

FOREIGN PATENT DOCUMENTS

CN          210575345 U       5/2020
DE    10 2014 103 324 A1      9/2015
(Continued)

*Primary Examiner* — Gary L Laxton
(74) *Attorney, Agent, or Firm* — McCormick, Paulding & Huber PLLC

(57) ABSTRACT

A common mode choke for connecting to DC side of a power converter. The common mode choke includes a choke core having first and second core portions for guiding magnetic flux. The common mode choke also includes a first winding and a second winding for generating magnetic flux, wherein both of the windings have series-connected first and second portions, respectively. The first portion of the first winding and the first portion of the second winding are concentrically around the first core portion, with the first portion of the first winding concentrically wound over the first portion of the second winding as an outer winding, and the second portion of the first winding and the second portion of the second winding are concentrically around the second core portion, with the second portion of the second winding concentrically wound over the second portion of the first winding as an outer winding.

11 Claims, 11 Drawing Sheets

(56) References Cited

U.S. PATENT DOCUMENTS

| | | | | |
|---|---|---|---|---|
| 2012/0106210 A1* | 5/2012 | Xu | ........................ | H02M 1/126 |
| | | | | 336/221 |
| 2014/0306789 A1* | 10/2014 | Hirai | ..................... | H01F 17/045 |
| | | | | 336/188 |
| 2017/0169935 A1* | 6/2017 | Miyamoto | .............. | H01F 19/04 |
| 2019/0043650 A1* | 2/2019 | Tamura | ................. | H01F 17/045 |
| 2020/0043642 A1* | 2/2020 | Wunsch | ................ | H01F 17/062 |

FOREIGN PATENT DOCUMENTS

| | | |
|---|---|---|
| DE | 10 2015 104 660 A1 | 9/2016 |
| EP | 2 993 676 A1 | 3/2016 |

\* cited by examiner

COMMON MODE CHOKE FOR CONNECTING TO DC SIDE OF POWER CONVERTER, FILTER ARRANGEMENT, AND POWER CONVERTER

CROSS-REFERENCE TO RELATED APPLICATION

This application claims foreign priority benefits under 35 U.S.C. § 119 from German Patent Application No. 102022108345.4, filed Apr. 6, 2022, the content of which is hereby incorporated by reference in its entirety.

TECHNICAL FIELD

The present invention relates in general to filter arrangements for power converters. In particular, however, not exclusively, the present invention concerns common mode chokes for power converters, such as rectifiers, Active Front Ends (AFEs), inverters, or frequency converters.

BACKGROUND

In known power converters, especially the ones which operation is based on pulse-width modulation (PWM), so called common mode and differential mode currents and/or voltages, which are normally undesired noise currents and/or voltages, are generated due to the structure of the converters as well as the control methods. In general, the quality related to waveforms produced by the PWM, for instance, are not acceptable, but they require at least some amount of filtering to be, for example, closer to ideal sinusoidal waveform.

A commonly used filter solution in PWM applications is an LCL filter coupled between the power converter and the electric power distribution network. An LCL filter normally comprises a capacitive filter, coupled between a first and a second inductive filters, and in some cases a common mode inductor all at the AC side (in many cases, the grid side) of the converter. In the known attempts, the inductors have been wound around common magnetic core. A drawback of this filter is that the total AC current, i.e. all of its differential mode (DM) and common mode (CM) components, must flow along all inductors coupled in series which causes losses and makes the filter large and difficult to fit into device housings as well as requires special attention to cooling.

SUMMARY

An objective of the present invention is to provide a common mode choke, a filter arrangement, and a power converter. Another objective of the present invention is to improve the common mode choke, such as relative to controlling, such as decreasing, the stray flux caused by the differential mode currents in the common mode choke, especially in connection with power converters in the power range of 50 kW or more.

The objectives of the invention are reached by a common mode choke, a filter arrangement, and a power converter as defined by the respective independent claims.

According to a first aspect, a common mode choke, preferably for connecting to DC side (also known as the DC link) of a power converter, is provided. The common mode choke comprises a choke core comprising a first core portion and a second core portion for guiding magnetic flux. The common mode choke also comprises a first winding and a second winding for generating magnetic flux in the core, such as when current is injected to at least one of the windings. Both of the windings comprise series-connected first and second portions, respectively. Furthermore, the first portion of the first winding and the first portion of the second winding are concentrically around the first core portion, and the second portion of the first winding and the second portion of the second winding are concentrically around the second core portion.

The material of the choke core may, in various embodiments, mostly comprise or consist of ferrite or iron, or the like, which are excellent magnetic flux carrier materials.

In some embodiments, turns of the concentrical portions may be arranged side by side around the core portions, respectively. Alternatively, the turns of the concentrical portions may be arranged as twisted pairs around the core portions, respectively.

In various embodiments, the portions of one of said windings may be arranged between the portions of another of said windings and the core portions, respectively. Thus, the concentrical winding portions define separate layers around the core portions in a transverse or lateral direction of the winding or core portions.

Alternatively, the first portion of one of said windings may be arranged between the first portion of another of said windings and the first core portion, and the second portion of said another of said windings may be arranged between the second portion of said one of said windings and the second core portion. In this case too, the concentrical winding portions define separate layers around the core portions in a transverse or lateral direction of the winding or core portions.

In addition, in some embodiments, turns of the concentrical portions may be arranged adjacent to each other in a transverse direction of the concentrical portions.

In various embodiments, the concentrical portions may be spaced apart with respect to each other in a transverse or lateral direction of the concentrical portions, such as by a spacer layer, and, optionally, at least by a distance of 0.5 or 1 millimeter. Thus, the turns of said portions are not in contact with each other, even by the electrical insulation thereon.

Alternatively or in addition, the common mode choke may comprise magnetic material between the concentrically arranged portions of the windings. Furthermore, the magnetic material may comprise or may be a magnetic material sheet, such as, to function as the spacer layer, arranged between the concentrical portions of the windings.

Furthermore, the common mode choke may comprise a cooling arrangement, such as liquid or air cooling arrangement. The cooling arrangement may comprise cooling elements into the winding and on the core material. It can as well be designed for air cooling with natural convection or forced air by using fans.

According to a second aspect, a filter arrangement, preferably for a power converter, is provided. The filter arrangement comprises a differential mode filter, such as a multi-phase differential mode filter, comprising one or several input inductors for connecting to AC phases of the power converter. The filter arrangement further comprises a common mode choke in accordance with the first aspect for connecting to DC side of the power converter, wherein the choke core of the common mode choke is spaced apart from magnetic core or cores of the input inductors of the three-phase differential mode filter. Thus, the same magnetic flux that may flow in the three-phase differential mode filter does not flow in the choke core of the common mode choke since they are, at least in this sense, separate devices. The filter arrangement may be, for example, a sine wave filter arrangement.

The three-phase differential mode filter may comprise a three-phase filter device or three single-phase filter devices. The three-phase differential mode filter may not be limited to three-phase system but may also be two, four or more phases comprise similar number of input capacitors and AC differential mode chokes respectively.

The filter arrangement may, preferably, comprise input capacitors to be connected between the AC phases and, optionally, ground potential.

According to a third aspect, a power converter, such as a rectifier, an inverter, or a frequency converter, is provided. The power converter comprises first terminals of AC phases, such as at input or output side, of the power converter, and second terminals at a DC side, such as being an output or input side or DC intermediate, of the power converter or comprised in a DC intermediate circuit of the power converter. Furthermore, the power converter comprises a first inverter or rectifier unit, preferably being bi-directional, arranged between the first terminals and the second terminals, the first inverter or rectifier unit comprising first semiconductor devices, such as diodes and/or controllable switches, and one or several DC intermediate circuit capacitors. Still further, the power converter comprises a differential mode filter, such as a three-phase DM filter, connected to the first terminals, and comprising inductors connected to the first terminals and first capacitors connected between the first terminals and a common point of coupling. The power converter also comprises at least two second capacitors connected in series between the second terminals, wherein a midpoint between the at least two second capacitors is connected to the common point of coupling. In addition, the power converter comprises a common mode choke in accordance with the first aspect connected to the second terminals at the DC side of the power converter.

Preferably, the first winding of the common mode choke is connected to a positive bus at the DC side, and the second winding of the common mode choke is connected to a negative bus at the DC side, or vice versa.

In various embodiments, the power converter comprises a second inverter or rectifier unit, preferably being bi-directional also known as Active Front End (AFE), arranged between the DC side and the output of the power converter, the second inverter or rectifier unit comprising second semiconductor devices, such as diodes and/or controllable switches.

The present invention provides a common mode choke, a filter arrangement, and a power converter. The present invention provides advantages over known solutions in that the common mode choke structure at least decreases, if not minimizes, the stray flux caused by the differential mode current flowing through the common mode choke. This is especially a problem in high-power high-current converters due to large stray flux from the differential currents. In some embodiments of the present invention, the structure includes very symmetric windings of the common mode choke between the positive and negative DC buses. This together with the decreased stray flux provides a common mode choke which is efficient and especially suited for high-power applications, such as having a rated power of 50 kilowatts or more, and either >200 VAC or >300 VDC, or both.

Furthermore, having magnetically separate common mode choke at the DC side of the power converter relative to the differential mode filter at the AC phases provides additional benefits, such as that with respect to the separate common mode choke, it is easier to wind two windings around one core portion instead of three. The separation also gives more freedom to the placement of the components e.g., in a cabinet or housing. Even if the windings of the common mode choke at the DC side may need to carry a slightly more current than in case the common mode choke would be at the AC side, there are only two windings which takes less space than the three AC-windings. This benefit will be more obvious for high power because the AC-coils suffer from skin depth phenomena (https://en.wikipedia.org/wiki/Skin_effect) which is not a problem on the DC-side. The total efficiency is better, especially at lower modulation indexes, because there is less current in the common mode choke windings than in the AC-coils as compared to known attempts with all windings at the AC side. In case of full output current at low modulation index, the conditions are not as severe as in known attempts because the differential mode current in the common mode choke windings is relatively low when the common mode part is high, which then affects the thermal design of the filter. Finally, the windings of the common mode choke can be designed with some stray inductance between them, even if still low amount, giving some differential mode inductance towards the DC side. This can be especially important in common DC-bus systems where the embodiments of present invention may be used to solve resonance issues between different intermediate circuit capacitor(s) by shifting the resonance frequency below the switching frequency area.

Various other advantages will become clear to a skilled person based on the following detailed description.

The expression "a number of" may herein refer to any positive integer starting from one, that is being one, at least one, or any integer more than one.

The expression "a plurality of" may refer to any positive integer starting from two, that is being two, at least two, or any integer more than two.

The terms "first", "second", "third", etc. are herein used to distinguish one element from other element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also unrecited features. The features recited in the appended claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF THE DRAWINGS

Some embodiments of the invention are illustrated by way of example, and not by way of limitation, in the figures of the accompanying drawings.

DETAILED DESCRIPTION

Figure 1A:
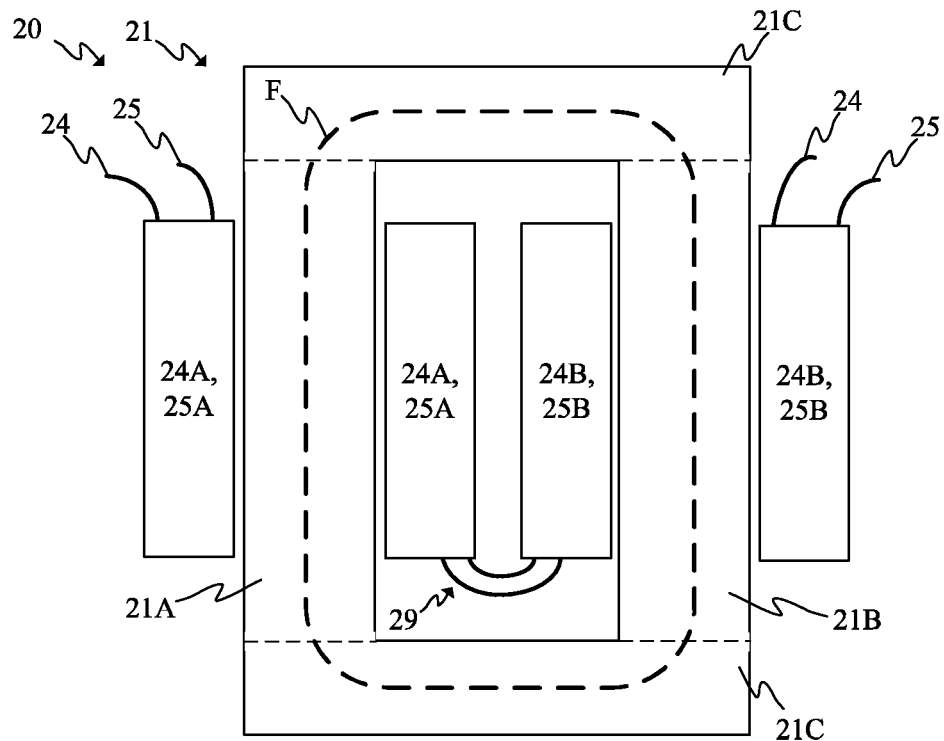
FIGS. 1A and 1B illustrate schematically common mode chokes.
Figure 1B:
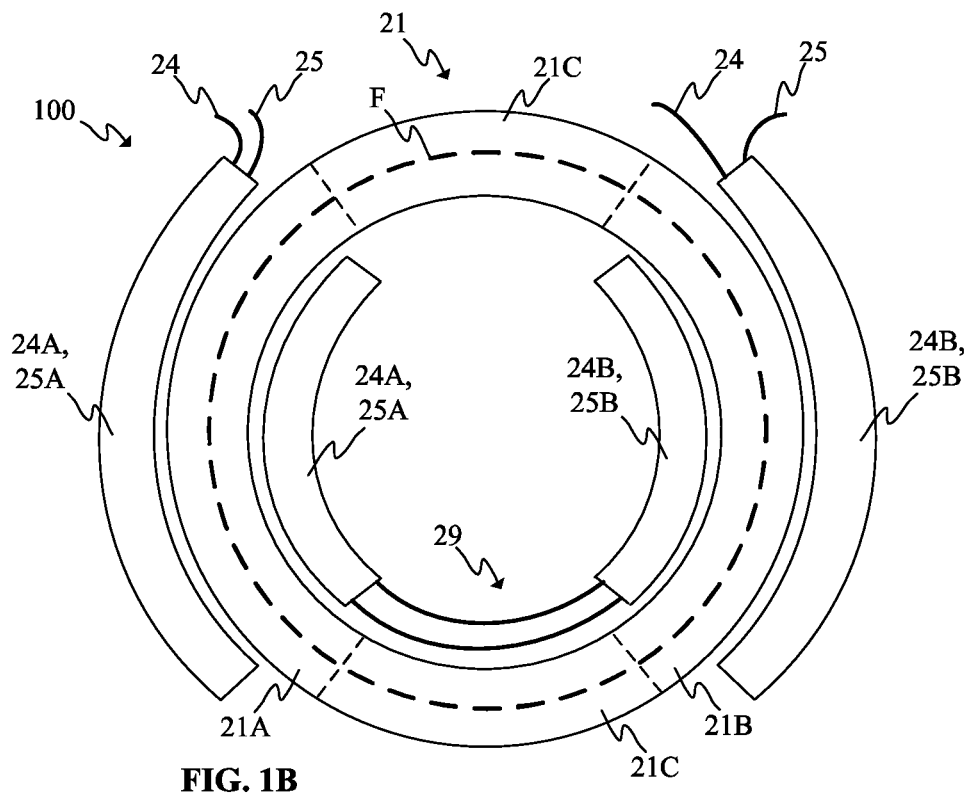

FIGS. 1A and 1B illustrate schematically common mode chokes 20. The common mode chokes 20 comprise a choke core 21 comprising a first core portion 21A and a second core portion 21B for guiding magnetic flux F during use of the common mode choke 20. As can be seen, when comparing FIGS. 1A and 1B, the shape of the choke core 21 along the intended path of flux F may differ from one embodiment to another, such as be rectangular or toroid/round. The core portions 21A, 21B may be of a single piece or be separate portions which have been attached to each other. FIG. 1A shows a choke core 21 which has a rectangular shape and FIG. 1B a choke core 21 which has a round or toroid shape. The cross-section of the core 21 may have essentially any shape, such as rectangular, round, oval, ellipse, etc, around which the windings 24, 25 can be wound. As visible, there may, optionally, also be intermediate core yokes 21C between the core portions 21A, 21B.

In various embodiments, the windings 24, 25 may be similar, if not identical, with respect to each other, e.g. relative to the number of turns of the windings 24, 25, so that same amount of current produces substantially similar magnetic flux. The similarity may be in the range of plus or minus 10 percentages relative to the amount of turns and/or to the amount of magnetic flux being generated by the same current in the windings 24, 25.

The material of the choke core 21 may, in various embodiments, mostly comprise or consist of ferrite or iron, or the like, which are excellent magnetic flux carrier materials.

The common mode chokes 20 further comprise a first winding 24 and a second winding 25 for generating magnetic flux F, when being injected with electrical current. The windings 24, 25 comprise series-connected first 24A, 25A and second portions 24B, 25B, respectively. As can be seen in FIGS. 1A and 1B, there may, preferably, be interconnection portions 29 for establishing the series connection between the first 24A, 25A and second portions 24B, 25B, respectively, which may be separate conductors, such as with connectors, or even initially integral parts of the windings 24, 25.

Still further, the first portion 24A of the first winding 24 and the first portion 25A of the second winding 25 are concentrically around the first core portion 21A, and the second portion 24B of the first winding 24 and the second portion 25B of the second winding 25 are concentrically around the second core portion 21B.

Figure 3A:
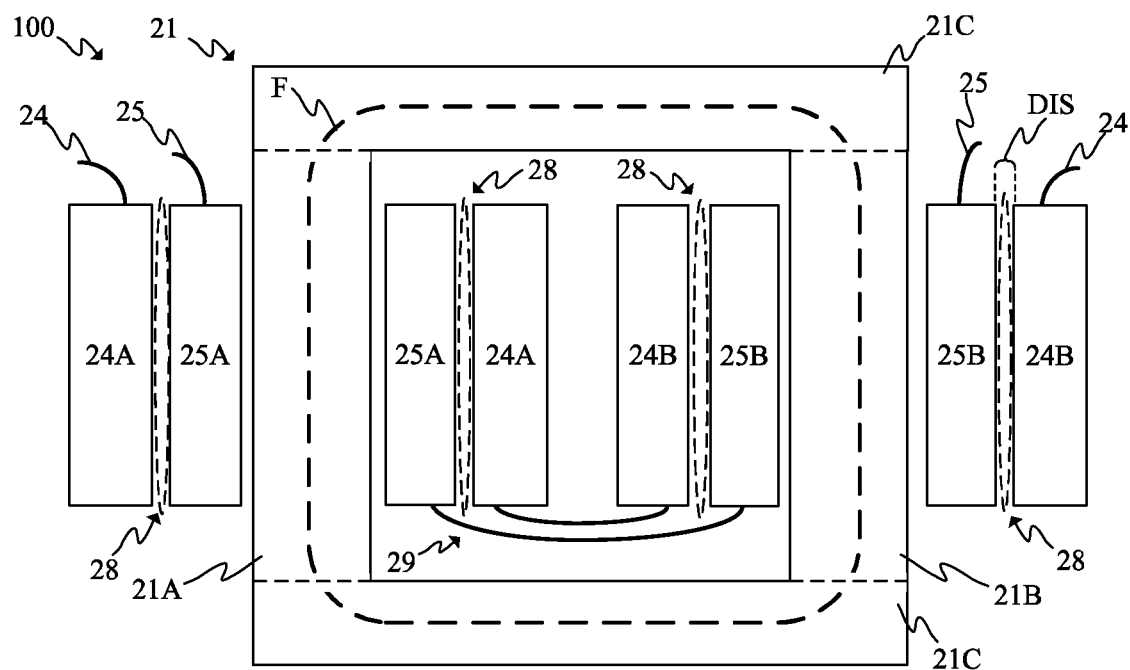
FIGS. 3A-3D illustrate schematically a common mode choke.
Figure 4A:
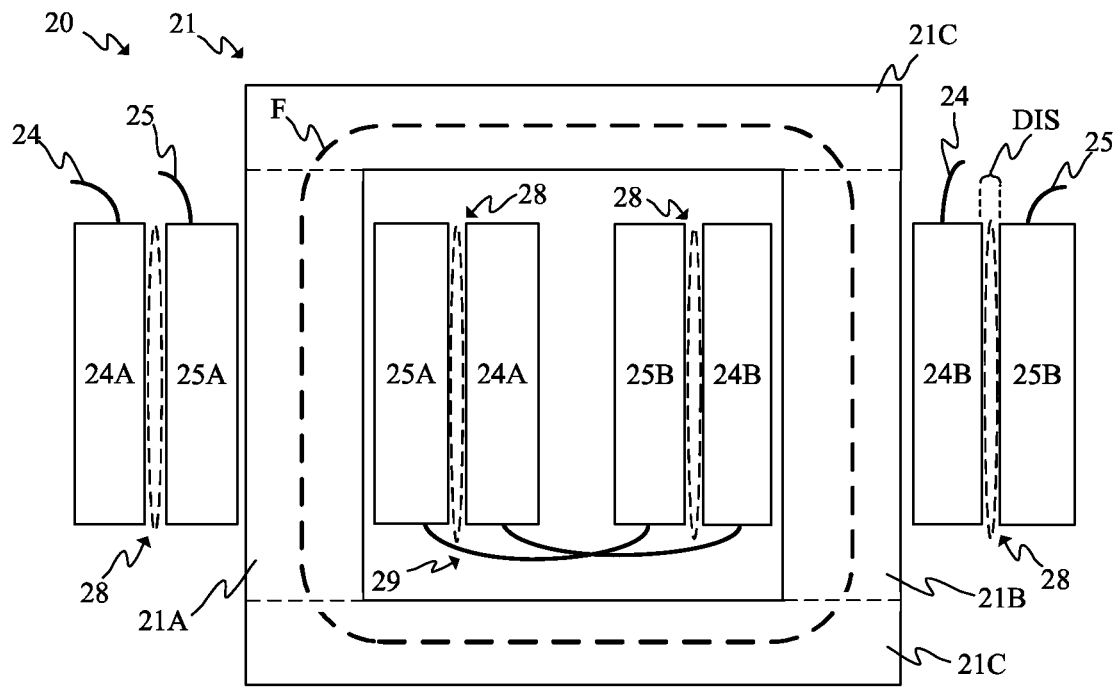
FIGS. 4A-4D illustrate schematically a common mode choke.
Figure 9:
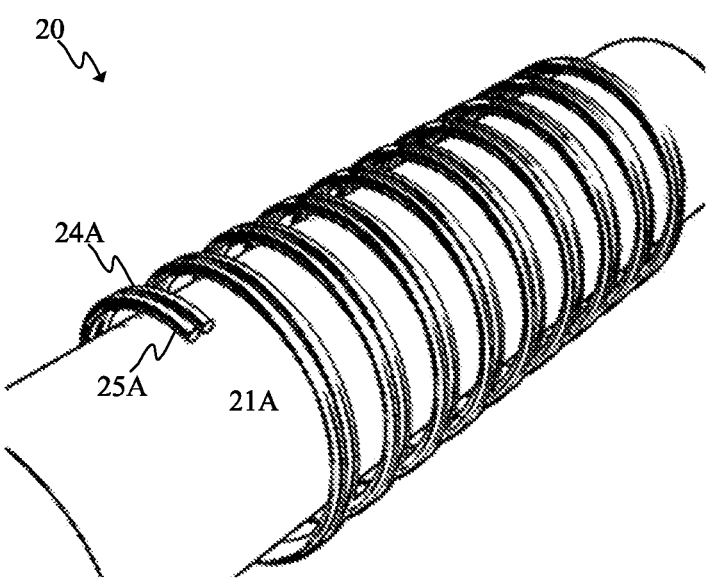
FIG. 9 illustrates schematically side by side turns of concentrical portions of windings of a common mode choke.
Figure 10:
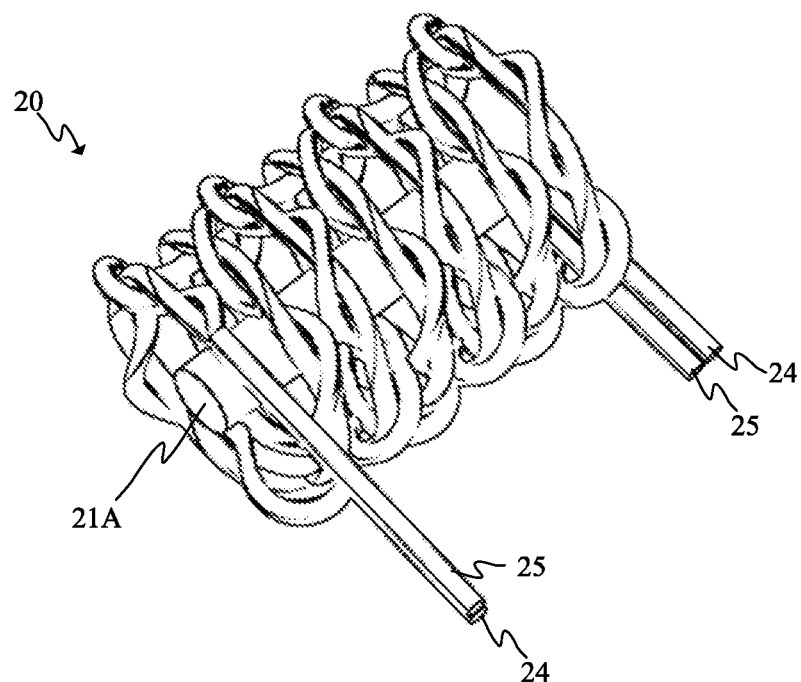
FIG. 10 illustrates schematically turns of concentrical portions of windings of a common mode choke as twisted pairs.

As will be more clearly shown with respect to FIGS. 3A and 4A, the use of concentrically arranged portions of windings 24A, 25A; 24B, 25B (even if provided such as shown in FIG. 9 or 10, or in some other concentrical manner), provides the effect that the stray flux caused or generated by differential mode current flowing through the common mode choke 20 is reduced or even minimized.

Figure 2:
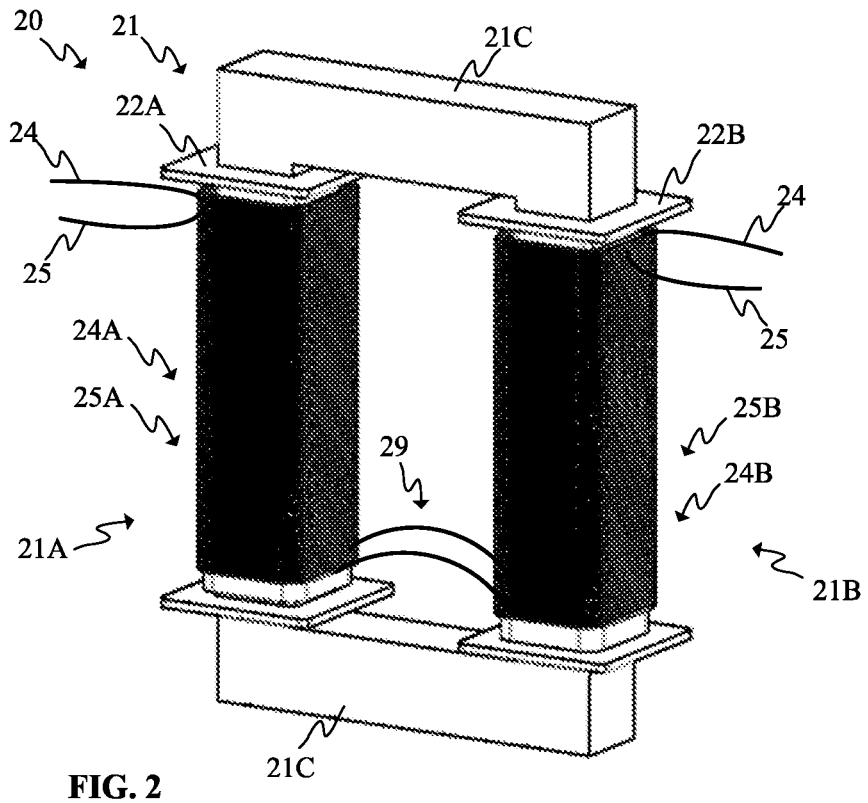
FIG. 2 illustrates schematically a common mode choke as a perspective view.

FIG. 2 illustrates schematically a common mode choke 20 as a perspective view. The common mode choke 20 may be substantially similar to the one shown in FIG. 1A, however, not necessarily identical. For example, there may be coil bobbins 22A, 22B around which the windings 24, 25 may be wound.

FIGS. 3A-3D illustrate schematically a common mode choke 20. In various embodiments, the portions 24A, 24B; 25A, 25B of one of said windings 24, 25, in the case of FIGS. 3A-3D the second winding 25, may be arranged between the portions 24A, 24B; 25A, 25B of another of said windings 24, 25, in the case of FIGS. 3A-3D the first winding 24, and the core portions 21A, 21B, respectively.

FIG. 3A also shows schematically the stray flux 28 caused by or generated due to differential mode current flowing in the common mode choke 20. The stray flux 28 can cause strong magnetic forces and eddy currents in any magnetic or conductive material close to the choke 20. These forces may cause heavy vibrations and high audible noise. It is also possible that the eddy currents can cause hot spots outside of the choke 20 due to induced eddy currents as the differential mode current also includes some AC-components. However, in various embodiments of the common mode choke 20 of the present invention, this problem has been at least alleviated by the concentrically arranged winding portions 24A, 25A; 24B, 25B. The stray flux 28 generated by the differential mode current causes substantially only stray flux between the winding portions 24A, 25A; 24B, 25B whereas the stray flux 28 is being at least partly cancelled outside of the windings 24, 25. In known attempts having only one winding around the core, the differential mode current can cause high stray flux which extends far from the choke. This reduction of stray flux may be especially useful in high-power (such as equal to or over 50 kW) devices, such as power converters, where the differential mode current can be well above 1000 A DC-current or low frequency currents, such as below 20 or 10 Hz or so.

Figure 3B:
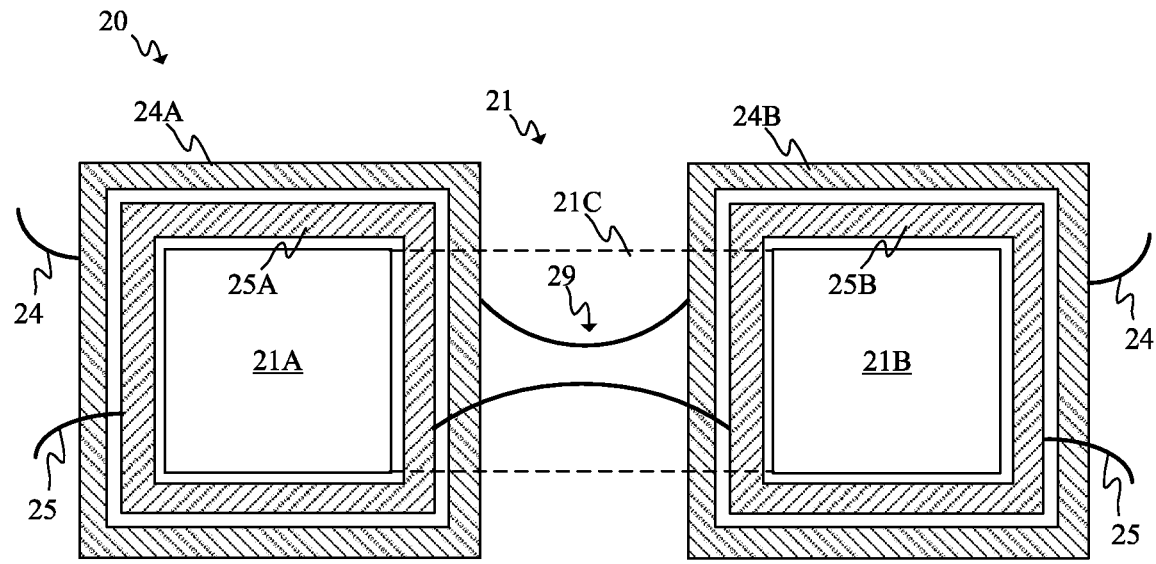

FIG. 3B shows the common mode choke 20 of FIG. 3A as a cross-sectional in a direction perpendicular to that of FIG. 3A. As can be seen in FIG. 3B, the portions 25A, 25B of the second winding 25 are wound between the portions 24A, 24B of the first winding 24, or the portions 24A, 24B of the first winding 24 are wound onto the portions 25A, 25B of the second winding 25. The stray flux 28 is not shown for legibility, however, it would substantially be confined into, in this case the rectangular space, between the winding portions 24A-25B.

Figure 3C:
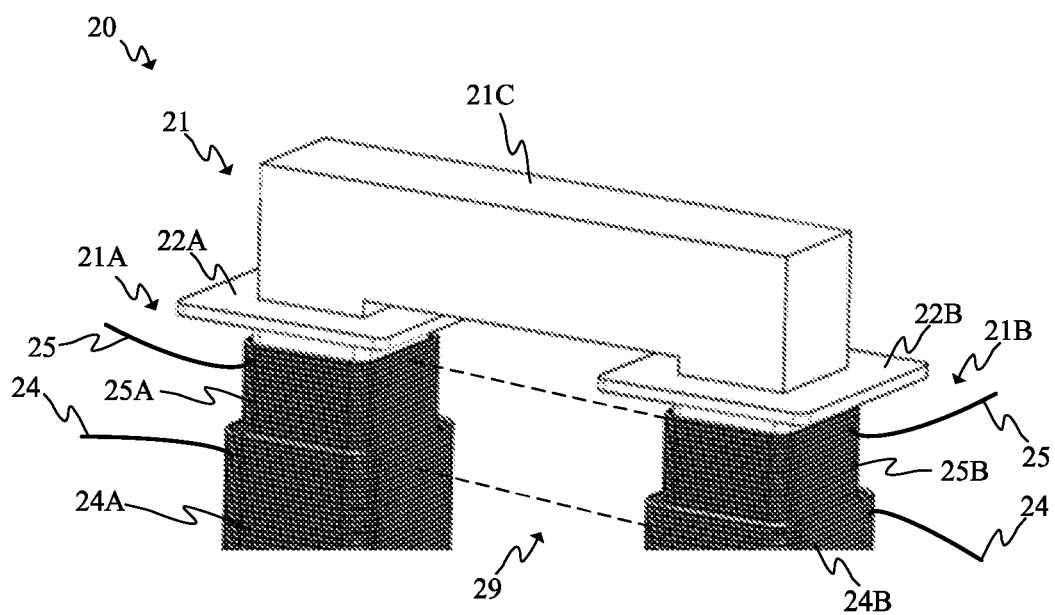
Figure 3D:
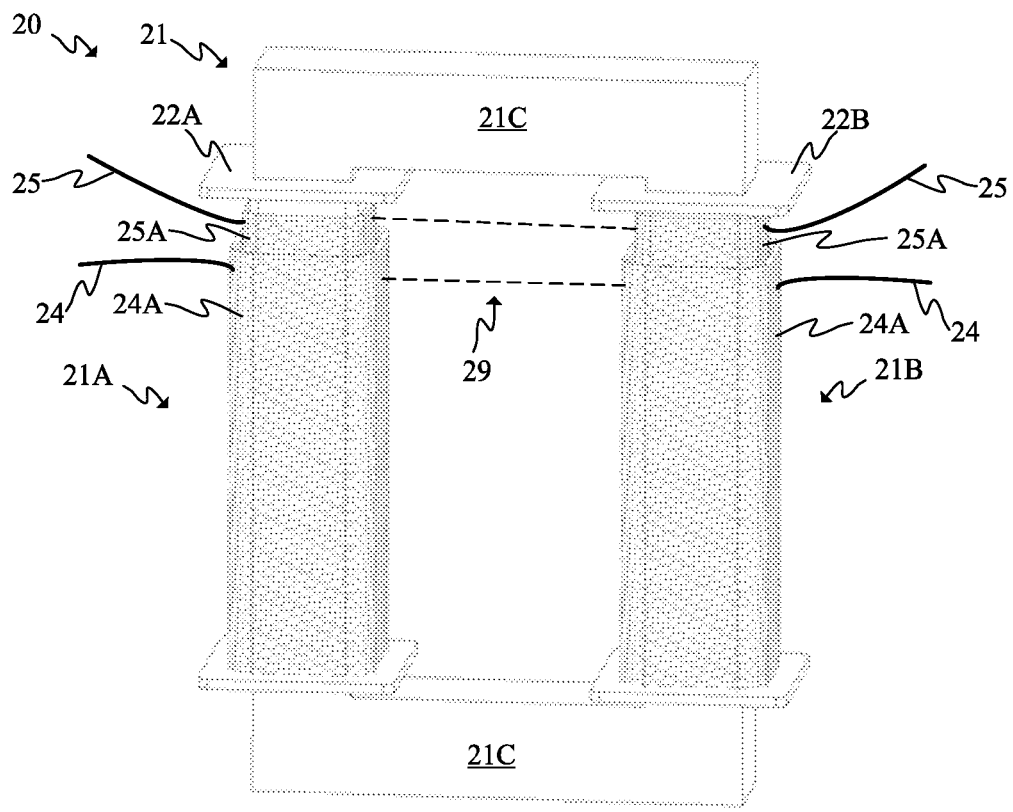

FIGS. 3C and 3D further shows the common mode choke 20 as a perspective view. The dashed lines indicating the interconnection portions 29 are highly schematical and merely indicate that the winding portions 24A, 24B; 25A, 25B are respectively connected in series, and they do not take indicate in which direction has the turns of the winding portions 24A, 25A; 24B, 25B and/or windings 24, 25 actually been wound. However, in various embodiments, the windings 24, 25 and the winding portions thereof 24A, 24B; 25A, 25B, have been wound so that the differential mode current flowing in the windings 24, 25 generates flux that is being at least partly cancelled such as described hereinbefore. For example, the direction of the turns of the windings 24, 25 around the core portions 21A, 21B may thus vary between different embodiments as long as they are such that the stray flux 28 caused by the differential mode current is as at least partly being cancelled. The cancellation happens due to substantially the same amount of differential current flowing through both of the windings 24, 25. Thus, as the windings 24, 25 are, preferably, substantially similar, if not identical, such as with respect to the turns in the windings 24, 25 as described hereinbefore, the stray fluxes 28, being produced and having such opposite polarities or directions between the windings 24, 25 due to the differential current, thus at least partially, if not (almost) completely, cancel each other outside the windings 24, 25. That being said, the windings 24, 25 should be wound relative to each other so that, when taking into account the direction of the differential current components in the windings 24, 25, the cancellation effect occurs outside the windings 24, 25 as is clear to a skilled person in the art in view of this disclosure. Thus, stray flux 28 due to the differential current remains to some more significant extent only between the windings 24, 25.

As shown in FIGS. 3A-3D, and what also applies to FIGS. 1A and 1B and all embodiments, the windings 24, 25 are, preferably, electrically insulated with respect to each other at least in the common mode choke 20.

FIGS. 4A-4D illustrate schematically a common mode choke 20. In various embodiments, the first portion 24A, 25A of one of said windings 24, 25, in the case of FIGS. 4A-4D the second winding 25, may be arranged between the first portion 24A, 25A of another of said windings 24, 25, in the case of FIGS. 4A-4D the first winding 24, and the first core portion 21A. Furthermore, the second portion 24A, 25A of said another of said windings 24, 25, in the case of FIGS. 4A-4D the first winding 24, may be arranged between the second portion 24A, 25A of said one of said windings 24, 25, in the case of FIGS. 4A-4D the second winding 25, and the second core portion 21B.

Similar remarks about the stray flux 28 apply for embodiments in accordance with FIGS. 4A-4D as to ones in accordance with FIGS. 3A-3D, however, the windings 24, 25 can additionally be made more symmetrical since the order of the winding portions 24A, 24B; 25A, 25B is changed relative to the core portions 21A, 21B, as is clearly visible in the figures. By making the windings 24, 25 like this, the impedances of the windings 24, 25 may be substantially equal and symmetric because the length of the wires of the windings 24, 25 are substantially equal, and the average distance between the windings 24, 25 and the magnetic choke core 21 is equal. In embodiments in accordance with FIG. 3A-3D, the unsymmetrical design may lead to impedances being not equal which may be undesired.

Figure 4B:
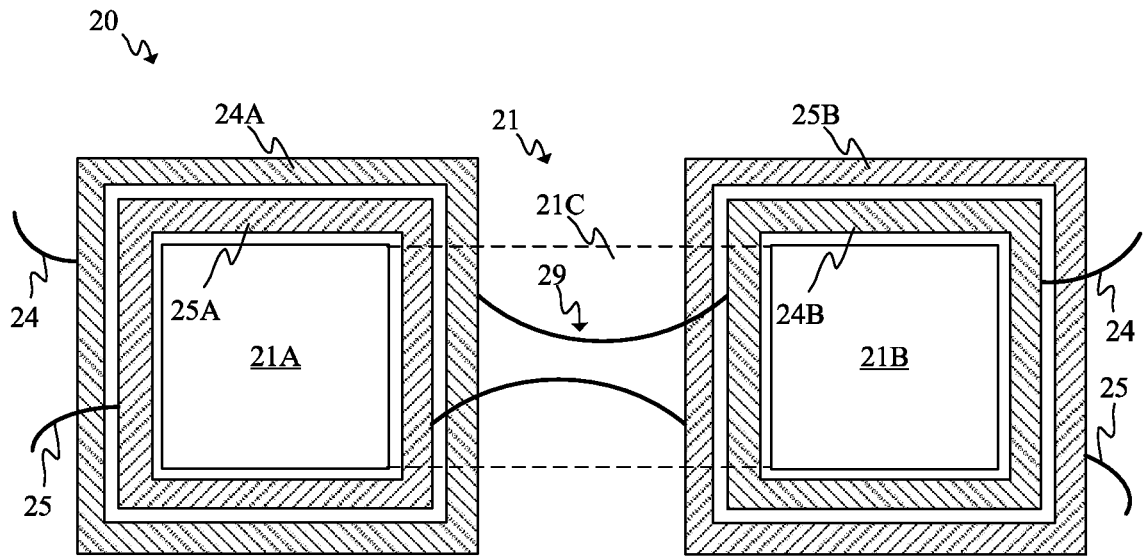
Figure 4C:
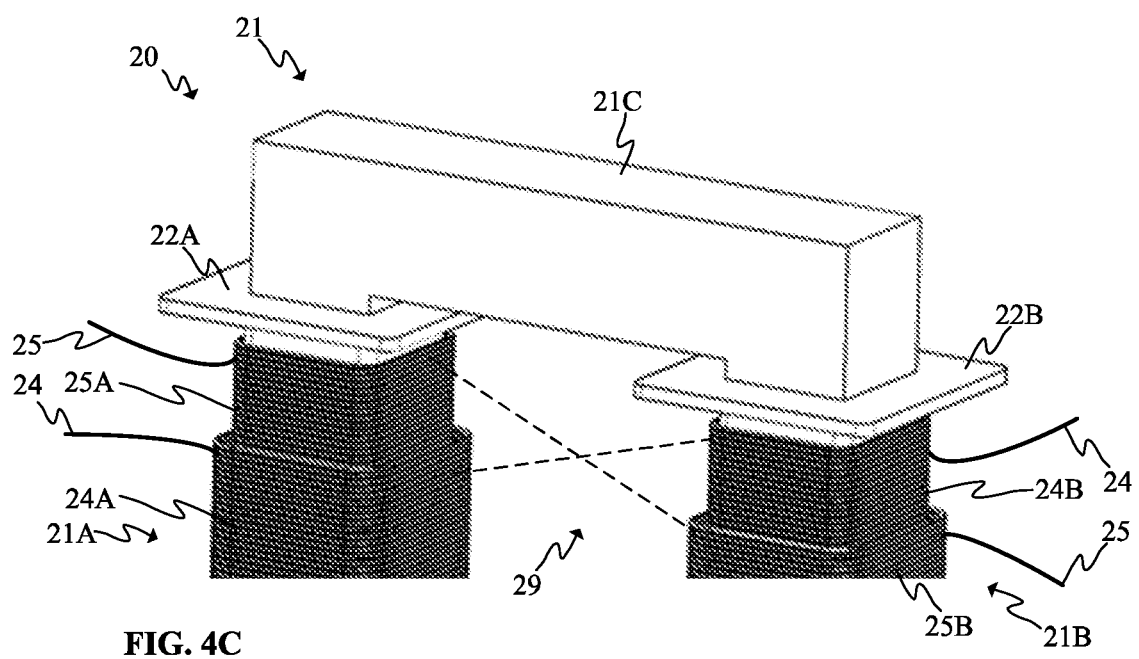
Figure 4D:
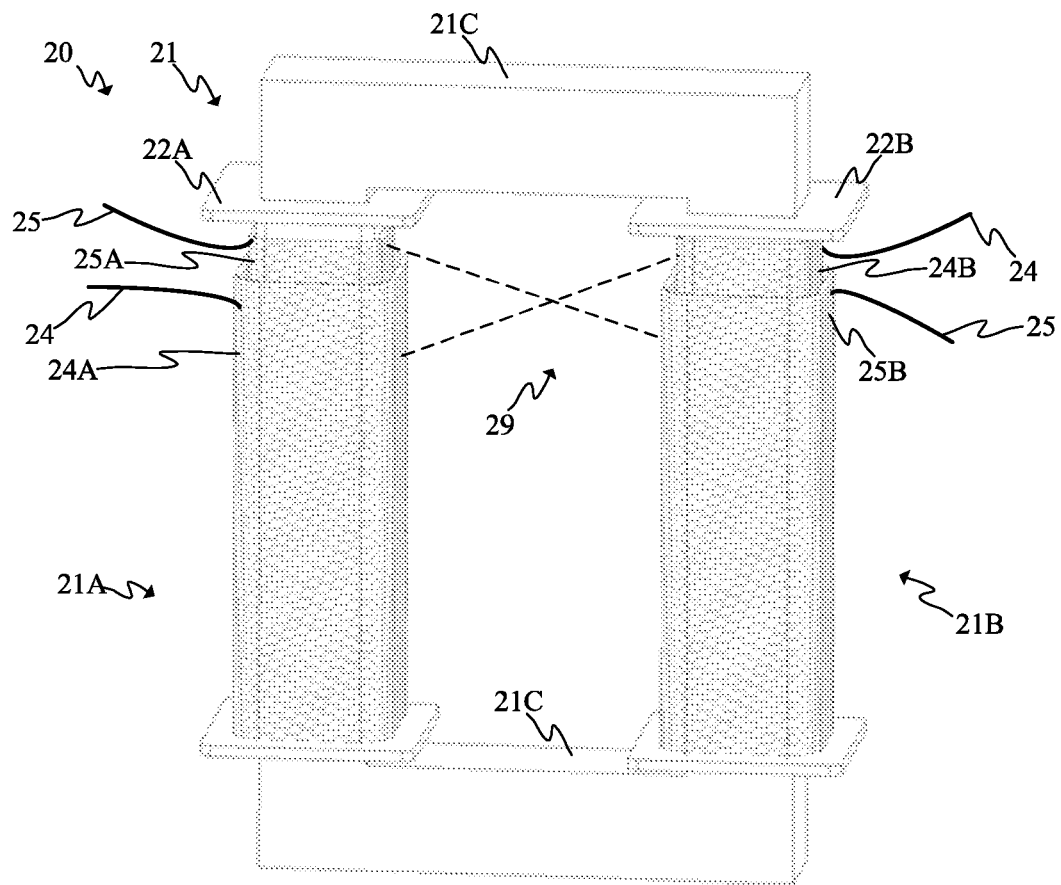

FIGS. 4C and 4D further shows the common mode choke 20 as a perspective view. The dashed lines indicating the interconnection portions 29 are highly schematical and merely indicate that the winding portions 24A, 24B; 25A, 25B are respectively connected in series, and they do not take indicate in which direction has the turns of the winding portions 24A, 25A; 24B, 25B and/or windings 24, 25 actually been wound. However, in various embodiments, the windings 24, 25 and the winding portions thereof 24A, 24B; 25A, 25B, have been wound so that the differential mode current flowing in the windings 24, 25 generates flux that is being at least partly cancelled outside the windings 24, 25, such as described hereinbefore. For example, the direction of the turns of the windings 24, 25 around the core portions 21A, 21B may thus vary between different embodiments as long as they are such that the stray flux 28 caused by the differential mode current is as at least partly being cancelled.

In some embodiments, for example, in accordance with FIGS. 3A-3D or 4A-4D, the concentrical portions 24A, 25A; 24B, 25B may, optionally, be spaced apart with respect to each other in a transverse direction of the concentrical portions 24A, 25A; 24B, 25B by a distance DIS. The distance DIS may be empty space, however, preferably it may be filled with a spacer layer. The spacer layer may, preferably, be of electrically insulating material, such as an insulation paper or tape, e.g. having high dielectric insulation properties. Alternatively or in addition, the spacer layer may be of magnetic or non-magnetic material. In some embodiments, the distance may be at least 0.5 or 1 millimeter.

The transverse or lateral direction refers herein to the direction most visibly shown in FIGS. 3B and 4B. The width of the rectangular space between the winding portions 24A, 25A; 24B, 25B is in the transverse or lateral direction is said figures. Thus, by adjusting the distance between the windings 24, 25, the differential mode inductance of the choke 20 can be adjusted. This may be used to facilitate differential mode current filtering in filter arrangements comprising the common mode choke 20 and optionally also separate differential mode filter(s).

Figure 5A:
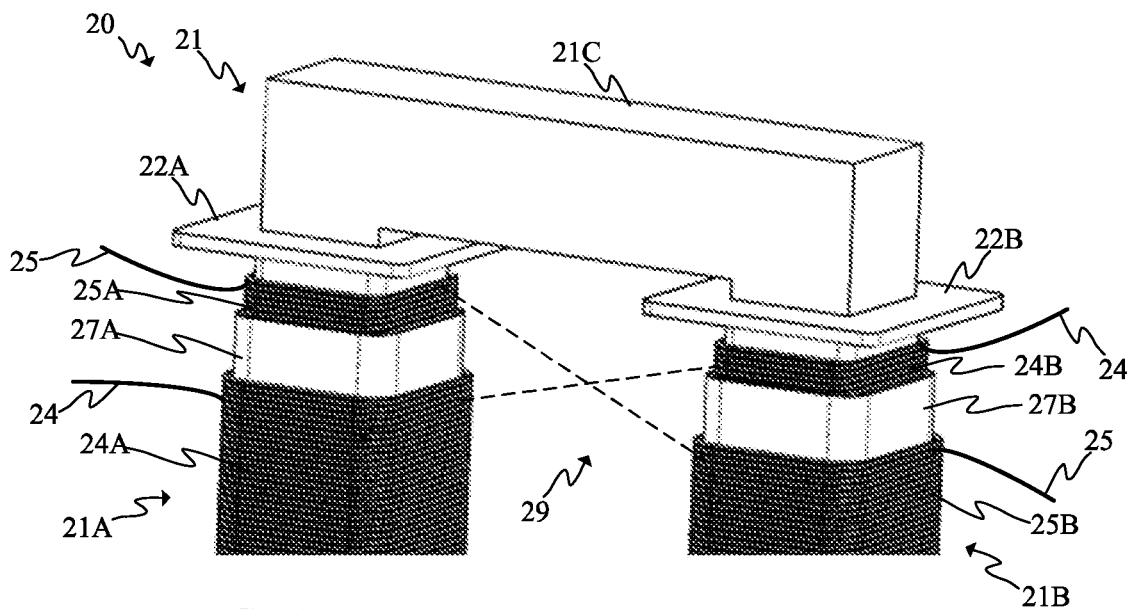
FIGS. 5A-5C illustrate schematically a common mode choke.
Figure 5B:
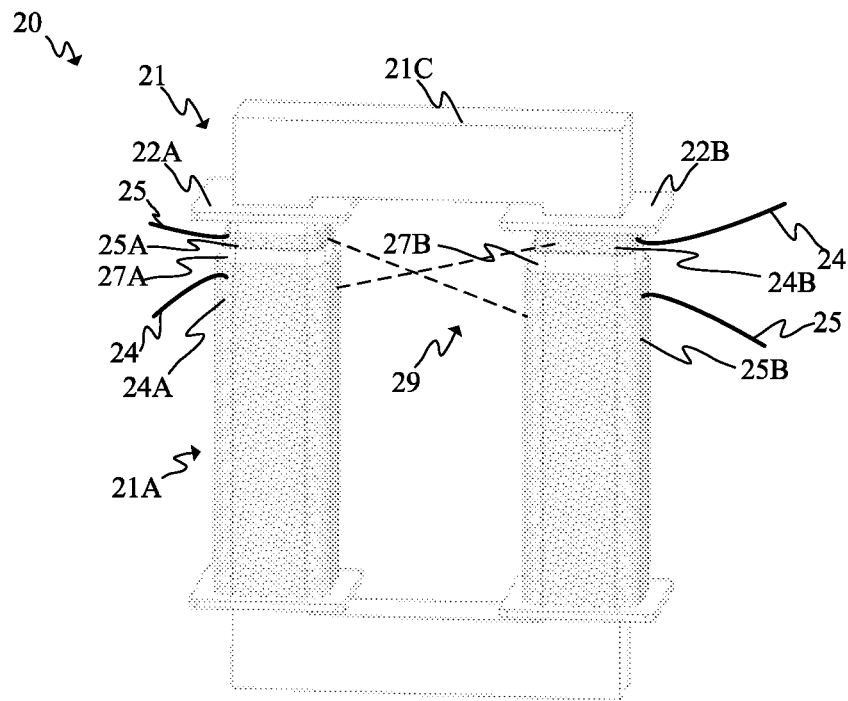
Figure 5C:
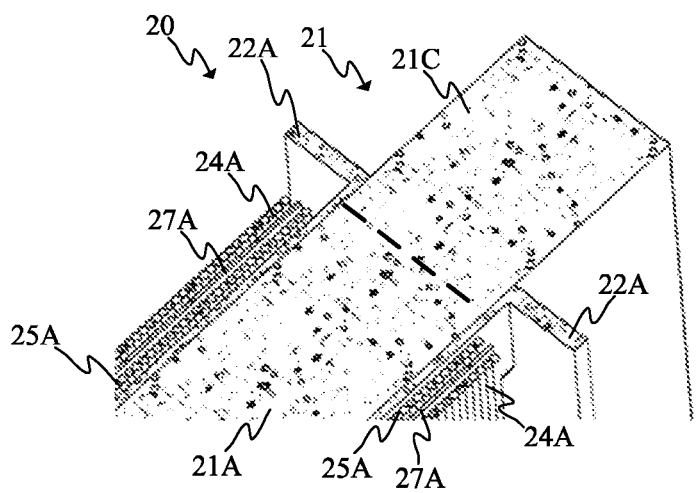

In various embodiments, alternatively or in addition to the spacing, the common mode choke 20 may comprise magnetic material between the concentrical portions 24A, 25A; 24B, 25B of the windings 24, 25. This may be further used to adjust the differential mode inductance. Example of this is illustrated in FIGS. 5A-5C which illustrate schematically a common mode choke 20. The common mode choke 20 may be essentially similar to the one shown in FIGS. 4A-4D, however, could alternatively be in accordance with FIGS. 3A-3D. In addition, however, a spacer layer 27A, 27B, such as a sheet, of magnetic material is arranged between the winding portions 24A, 25A; 24B, 25B. There may a spacing of less than, equal to, or more than 0.5 or 1 millimeter therebetween. The spacing DIS may thus be defined by the thickness of the spacer layer 27A, 27B or the insulation material between the windings 24, 25, or by both when used in combination.

In various embodiments, the common mode choke 20 may comprise a cooling arrangement, such as liquid or air cooling arrangement. The cooling arrangement may comprise cooling elements into the winding and on the core material. It can as well be designed for air cooling with natural convection or forced air by using fans.

Figure 6A:
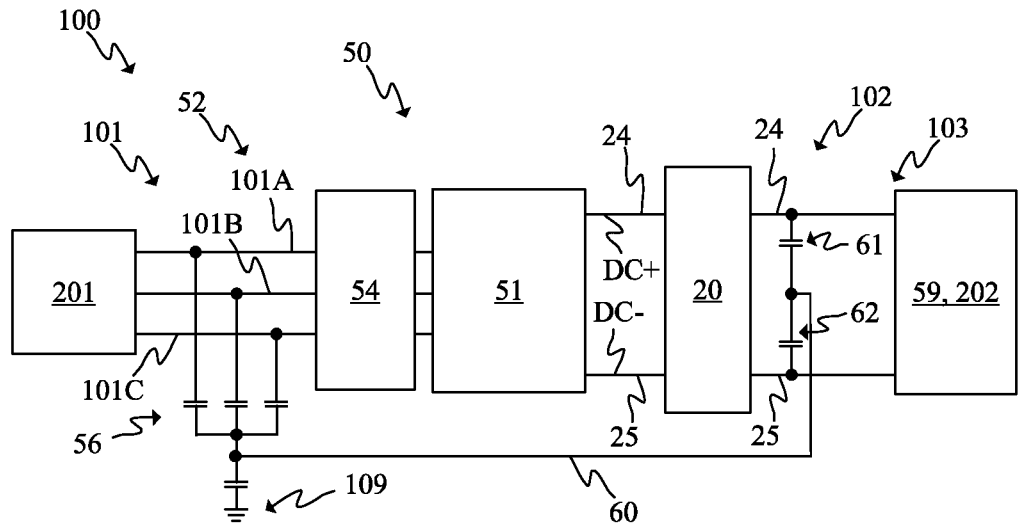
FIGS. 6A and 6B illustrate schematically filter arrangements and power converters.

FIG. 6A illustrates schematically a filter arrangement 50, such as for a power converter 100, and a power converter 100. In various embodiments, the filter arrangement 50 may comprise a differential mode (DM) filter 52, such as a three-phase DM filter, comprising at least inductors 54 for connecting to terminals 101A-101C of AC phases 101 of, for example, a power converter 100. Furthermore, the filter arrangement 50 may comprise a common mode choke 20 in accordance with an embodiment of the present invention, such as for connecting to terminals DC+, DC− at DC side 102 of the converter 100, and at least two second capacitors 61, 62 connected in series between the second terminals DC+, DC−, wherein a midpoint between the at least two second capacitors 61, 62 is connected to the common point of coupling 60. The choke core 21 of the common mode choke 20 is, preferably, spaced apart from magnetic core or cores of the inductors 54 of the differential mode filter 52.

In various preferable embodiments, the filter arrangement 50 may comprise capacitors 56 to be connected between the terminals 101A-101C of the AC phases 101 and a common point of coupling (60), and, optionally, also relative to a ground potential 109, such as directly or through a capacitor.

Regarding the power converter 100, it may, in various embodiments, comprise the AC phases 101 at input side of the power converter 100. The AC phases may be connected or arranged to be connected to an external AC power source, such as a one or three-phase electrical power grid having fundamental frequency of 50 or 60 Hz, for instance. Furthermore, the power converter 100 may comprise the DC side 102, such as comprising a DC intermediate circuit, e.g. including DC intermediate capacitor(s).

The power converter 100 may, preferably, also comprise a first inverter or rectifier unit 51, preferably being bi-directional, arranged between the AC phases 101 and the DC side 102, the first inverter or rectifier unit 51 comprising first semiconductor devices, such as diodes and/or controllable switches, which may be operated to provide the rectification towards the DC side 102. The power converter 100 also, preferably, comprises a differential mode filter 50 connected to the AC phases 101 of the power converter 100. Finally, the power converter 100 comprises a common mode choke 20 in accordance with an embodiment as disclosed herein and being arranged to the DC side 102 of the power converter 100.

In various embodiments, the first winding 24 of the common mode choke 20 may be connected to a positive bus DC+ at the DC side 102, and the second winding 25 of the common mode choke 20 to a negative bus DC− at the DC side 102, or vice versa.

In various embodiments, the DC side 102, such as the output 103 or the DC intermediate circuit may be connected directly or may be arranged to be connected to an external load. However, in various embodiments, the power converter 100 may further comprise a second inverter or rectifier unit 59, preferably being bi-directional, arranged between the DC side 102 and an output 103 of the power converter 100, the second inverter or rectifier unit 59 comprising second semiconductor devices, such as diodes and/or controllable switches, which may be operated to provide the inverter functionality. The output 103 may then be connected to the external load, such as to input terminals of an electric motor.

Figure 6B:
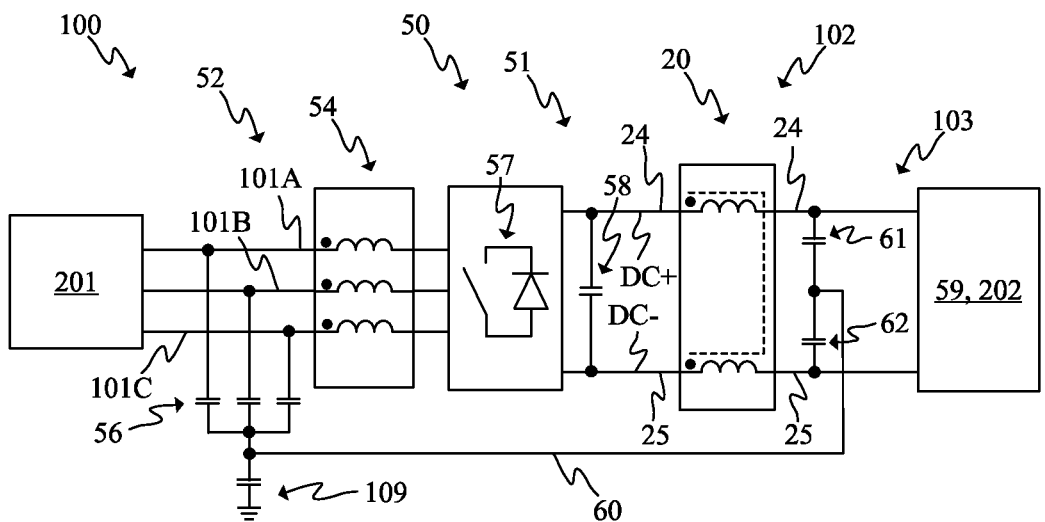

The differential mode filter 52 may comprise a filter device, such as a one or multiphase filter device, such as shown in FIG. 6B with the dots representing coupled inductors, or several single-phase filter devices, in case there would not be said dots.

FIG. 6B illustrates schematically another filter arrangement 50, such as for a power converter 100, and the power converter 100, which is an inverter. The filter arrangement 50 and the power converter 100 may be substantially similar to the ones in FIG. 6A, however, FIG. 6B shows further details which may or may not be present in the embodiments in accordance with FIG. 6A.

As becomes clear from the description above, the windings 24, 25 are coupled to each other. This is illustrated in FIG. 6B in relation to the common mode choke 20 by the dots and the dashed line essentially between the dots.

As can be seen, FIG. 6B shows the first semiconductor devices 57, such as diodes and/or controllable switches. The devices 57 may have been arranged in accordance with a full-bridge topology, for instance. Furthermore, FIG. 6B shows DC intermediate capacitor(s) 58 arranged between the common mode choke 20 and the unit of first semiconductor devices 57.

Figure 7A:
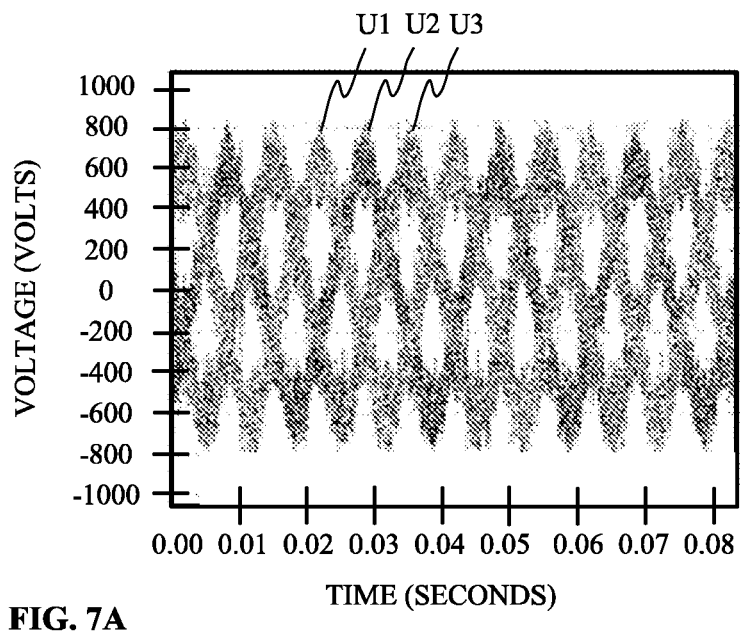
FIGS. 7A and 7B shows graphs of input phase-to-ground voltages of a power converter without and with a common mode choke in accordance with an embodiment of the present invention being arranged in connection thereto.
Figure 7B:
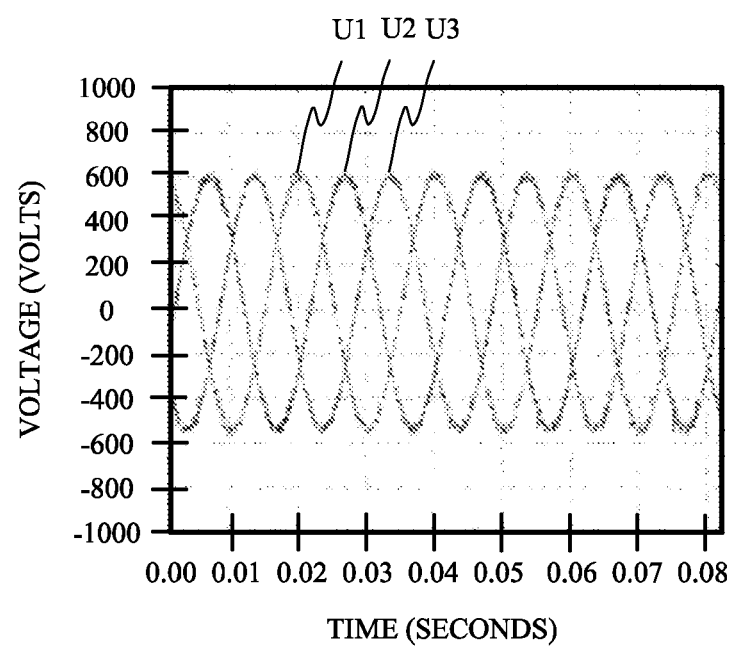

FIGS. 7A and 7B shows graphs of input phase-to-ground voltages U1-U3 of a power converter 100 without and with a common mode choke 20 in accordance with an embodiment of the present invention being arranged in connection thereto. In FIG. 7A, THDu (Total Harmonic Distortion voltage) value related to the voltages is approximately 23.1%. In FIG. 7B, the THDu value is about 2.3%. This can also clearly be seen in the graphs where the voltages in FIG. 7B more closely resemble an ideal sinusoidal waveform. In general, THDu as referred to herein, is a measurement that defines the amount of distortion of a voltage due to harmonics in the voltage signal. It may be defined as a sum of the powers of all harmonic components of the signal to the power of the fundamental frequency of the signal.

For example, as the common mode choke 20 on the DC-side is separated from the AC-side having the fundamental frequency thereof, it can be beneficial to use DC-side common mode choke according to various embodiments as described herein especially in high speed/frequency applications.

In some experiments, in which an electric motor was connected to the output of an inverter unit 59 of a converter 100, a motor peak voltage without the common mode choke 20 in connection with the DC side 102 of the converter 100 was around 2 kV (kilovolts) and with the common mode choke 20, the peak voltage at the motor was only around 1.2 kV. In addition to this, the voltage at the intermediate circuit (peak-to-ground) decreased from around 1400 V to below 1000 V facilitating the connection of batteries directly to the intermediate circuit without galvanic isolation in between in order to comply with some requirements.

Figure 8:
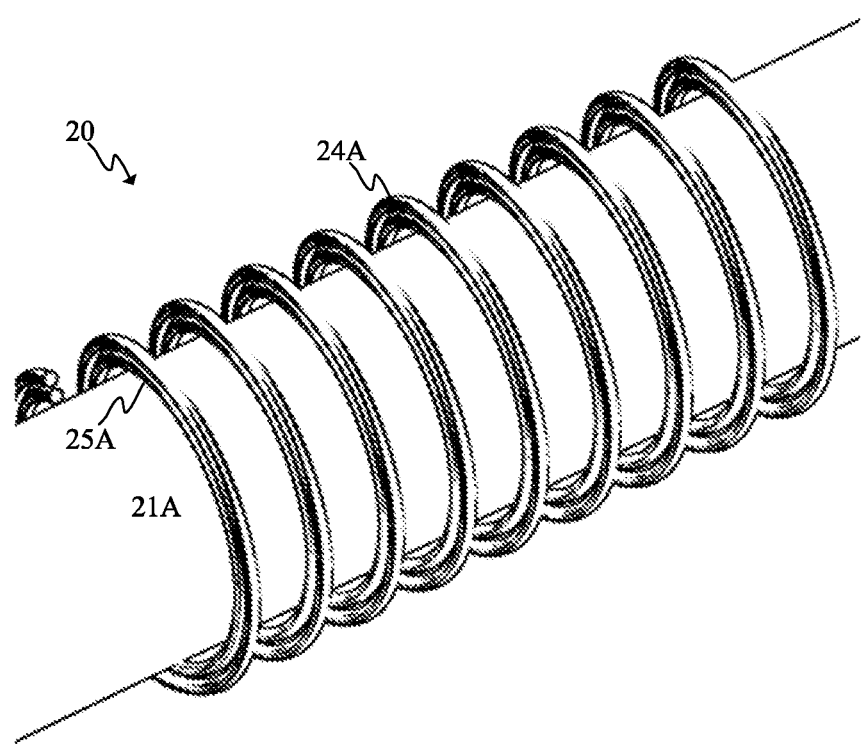
FIG. 8 illustrates schematically adjacent turns of concentrical portions of windings of a common mode choke.

Referring still to the winding portions 24A, 24B, 25A, 25B, of the common mode choke 220, FIG. 8 illustrates schematically adjacent turns of concentrical portions 24A, 25A; 24B, 25B of the windings 24, 25. As can be seen, the turns of the concentrical portions 24A, 25A; 24B, 25B may be arranged adjacent to each other in the transverse or lateral direction of the concentrical portions 24A, 25A; 24B, 25B. In some embodiments, the turns are in contact with each other, notwithstanding any insulating material layer or coating therebetween. Windings 24, 25 in accordance with FIG. 8 may relate, for example, to embodiments in accordance with FIGS. 3A-3D and 4A-4D.

In various embodiments, the concentrical winding portions 24A, 25A; 24B, 25B may alternatively be arranged as in FIG. 9. FIG. 9 illustrates schematically side by side turns of concentrical portions 24A, 25A; 24B, 25B of windings 24, 25 of a common mode choke 20. Thus, the concentrical portions 24A, 25A; 24B, 25B do not necessarily form such distinctive or separable layers of turns in the transverse or lateral direction as shown in FIGS. 3A-5C. On the contrary, the turns may be mixed.

FIG. 10 illustrates schematically another embodiment in which the turns of concentrical portions 24A, 25A; 24B, 25B of windings 24, 25 of a common mode choke 20 are mixed in a way similar manner as in FIG. 9. In FIG. 10 the turns are wound as twisted pairs.

Figure 11:
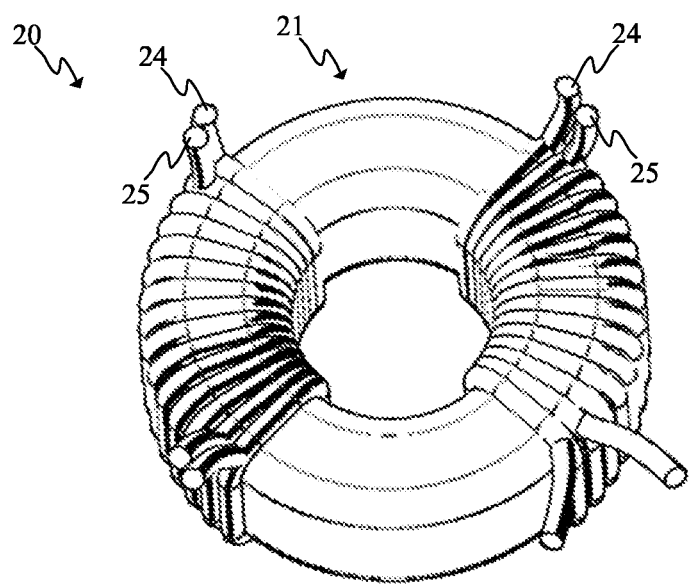
FIG. 11 illustrates schematically a common mode choke being a toroid common mode choke.

FIG. 11 illustrates schematically a common mode choke 20 being a toroid common mode choke 20. As can also be seen, the cross-sectional of the choke core 21 is not rectangular nor round, but a rectangle with rounded corners or an octagon or the like.

The specific examples provided in the description above are not exhaustive unless otherwise explicitly stated, nor should they be construed as limiting the scope and/or the applicability of the accompanied claims. The features recited in the accompanied dependent claims are mutually freely combinable unless otherwise explicitly stated. The verbs "to comprise" and "to include" are used in this document as open limitations that neither exclude nor require the existence of also unrecited features. Furthermore, it is to be understood that the use of "a" or "an", i.e. a singular form, throughout this document does not exclude a plurality.

What is claimed is:

1. A common mode choke for connecting to DC side of a power converter, the common mode choke comprising:
    a choke core comprising a first core portion and a second core portion for guiding magnetic flux and,
    a first winding and a second winding for generating magnetic flux, wherein each of the windings comprise series-connected first and second portions, respectively, and
    wherein, on the first core portion, the first portion of the second winding is wound as an inner winding adjacent to the core, and the first portion of the first winding is wound concentrically over the first portion of the second winding as an outer winding, and
    on the second core portion, the second portion of the first winding is wound as an inner winding adjacent to the core, and the second portion of the second winding is wound concentrically over the second portion of the first winding as an outer winding.

2. The common mode choke of claim 1, wherein the inner and outer winding portions are arranged adjacent to each other in a transverse direction of the winding portions.

3. The common mode choke of claim 1, wherein the inner and outer winding portions are spaced apart with respect to each other in a transverse direction by a spacer layer.

4. The common mode choke of claim 1, comprising magnetic material between the inner and outer winding portions.

5. The common mode choke of claim 4, wherein the magnetic material comprises or consists of a magnetic material sheet arranged between the inner and outer winding portions.

6. The common mode choke of claim 1, comprising a liquid or air cooling arrangement.

7. A filter arrangement for a power converter, comprising:
    a differential mode filter comprising inductors for connecting to first terminals of AC phases of the power converter, and first capacitors for connecting between the first terminals and a common point of coupling, and
    the common mode choke in accordance with claim 1 for connecting to second terminals at the DC side of the power converter, wherein the choke core of the common mode choke is spaced apart from magnetic core or cores of the inductors of the differential mode filter, and
    at least two second capacitors connected in series between the second terminal, wherein a midpoint between the at least two second capacitors is connected to the common point of coupling.

8. The filter arrangement of claim 7, wherein the common point of coupling is connected to a ground potential either directly or through a grounding capacitor.

9. A power converter, comprising:
    first terminals of AC phases of the power converter,
    second terminals at a DC side of the power converter or in a DC intermediate circuit of the power converter,
    a first inverter or rectifier unit arranged between the first terminals and the second terminals, the first inverter or rectifier unit comprising first semiconductor devices and one or several DC intermediate circuit capacitors,
    a differential mode filter connected to the first terminals, and comprising inductors connected to the first terminals, and first capacitors connected between the first terminals and a common point of coupling,
    at least two second capacitors connected in series between the second terminals, wherein a midpoint between the at least two second capacitors is connected to the common point of coupling, and
    the common mode choke in accordance with claim 1 connected to the second terminals at the DC side of the power converter.

10. The power converter of claim 9, wherein the first winding of the common mode choke is connected to a positive bus at the DC side, and the second winding of the common mode choke is connected to a negative bus at the DC side, or wherein the first winding of the common mode choke is connected to a negative bus at the DC side, and the second winding of the common mode choke is connected to a positive bus at the DC side.

11. The power converter of claim 9, comprising a second inverter or rectifier unit arranged between the DC side and an output of the power converter, the second inverter or rectifier unit comprising second semiconductor devices.

* * * * *